(12) United States Patent
Nelson et al.

(10) Patent No.: US 11,351,696 B2
(45) Date of Patent: Jun. 7, 2022

(54) ADDITIVE LAYER METHOD FOR APPLICATION OF SLURRY-BASED FEATURES

(71) Applicants: Rolls-Royce Corporation, Indianapolis, IN (US); Rolls-Royce High Temperature Composites Inc., Cypress, CA (US)

(72) Inventors: Scott Nelson, Carmel, IN (US); Quinlan Shuck, Indianapolis, IN (US); Sean Landwehr, Avon, IN (US); Sungbo Shim, Irvine, CA (US)

(73) Assignees: ROLLS-ROYCE CORPORATION, Indianapolis, IN (US); ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 428 days.

(21) Appl. No.: 16/278,265

(22) Filed: Feb. 18, 2019

(65) Prior Publication Data

US 2019/0255732 A1 Aug. 22, 2019

Related U.S. Application Data

(60) Provisional application No. 62/632,283, filed on Feb. 19, 2018.

(51) Int. Cl.
*B28B 1/00* (2006.01)
*B33Y 10/00* (2015.01)
(Continued)

(52) U.S. Cl.
CPC .......... *B28B 1/001* (2013.01); *B29C 64/165* (2017.08); *B33Y 10/00* (2014.12); *B33Y 40/00* (2014.12);
(Continued)

(58) Field of Classification Search
CPC ..... B28B 1/001; B29C 64/153; B29C 64/165; B29C 64/188; B29C 64/214;
(Continued)

(56) References Cited

U.S. PATENT DOCUMENTS

| 5,284,695 A | 2/1994 | Barlow et al. |
| 5,387,380 A | 2/1995 | Cima et al. |

(Continued)

OTHER PUBLICATIONS

Halbig, Michael C. et al., "A Fully Nonmentallic Gas Turbine Engine Enabled by Additive Manufacturing," Part III: Additive Manufacturing and Characterization of Ceramic Composites, NASA/TM—2015-218892, Dec. 2015, 16 pgs.

*Primary Examiner* — Xiao S Zhao
*Assistant Examiner* — Joseph S Leyson
(74) *Attorney, Agent, or Firm* — Crowell & Moring LLP

(57) ABSTRACT

A system and method for forming a porous ceramic preform is provided. The method may include forming a stacked powder structure including a binder layer and a powder layer on the binder layer. The binder layer may be formed by depositing a binder with a spray nozzle on a substrate. The powder layer may be formed by depositing a powder on the binder layer. The porous ceramic preform may be formed by heating the stacked powder structure to pyrolyze the binder. The porous ceramic preform is configured to be infiltrated by a molten material. The substrate may comprise a ceramic fiber preform. After melt infiltration of the porous ceramic preform and the ceramic fiber preform, a densified ceramic feature having a predetermined geometry may be formed on a ceramic matrix composite (CMC) component.

18 Claims, 3 Drawing Sheets

(51) Int. Cl.
  *B29C 64/165* (2017.01)
  *B33Y 40/00* (2020.01)
  *C04B 35/622* (2006.01)
  *C04B 35/628* (2006.01)
  *C04B 35/657* (2006.01)
  *C04B 35/571* (2006.01)
  *C04B 35/573* (2006.01)
  *C04B 35/58* (2006.01)
  *C04B 35/591* (2006.01)
  *C04B 35/80* (2006.01)

(52) U.S. Cl.
  CPC .......... *C04B 35/571* (2013.01); *C04B 35/573* (2013.01); *C04B 35/58* (2013.01); *C04B 35/591* (2013.01); *C04B 35/62277* (2013.01); *C04B 35/62281* (2013.01); *C04B 35/62286* (2013.01); *C04B 35/62863* (2013.01); *C04B 35/62884* (2013.01); *C04B 35/657* (2013.01); *C04B 35/80* (2013.01); *C04B 2235/3418* (2013.01); *C04B 2235/524* (2013.01); *C04B 2235/5244* (2013.01); *C04B 2235/5252* (2013.01); *C04B 2235/5436* (2013.01); *C04B 2235/5472* (2013.01); *C04B 2235/5481* (2013.01); *C04B 2235/614* (2013.01); *C04B 2235/616* (2013.01)

(58) Field of Classification Search
  CPC ... B29C 64/218; B29C 64/255; B29C 64/336; B33Y 10/00; B33Y 40/00; C04B 2235/3418; C04B 2235/424; C04B 2235/425; C04B 2235/427; C04B 2235/48; C04B 2235/483; C04B 2235/524; C04B 2235/5244; C04B 2235/5248; C04B 2235/5252; C04B 2235/526; C04B 2235/5264; C04B 2235/5296; C04B 2235/5436; C04B 2235/5472; C04B 2235/5481; C04B 2235/6026; C04B 2235/314; C04B 2235/616; C04B 2237/38; C04B 2237/61; B32B 18/00
  See application file for complete search history.

(56) References Cited

U.S. PATENT DOCUMENTS

| | | |
|---|---|---|
| 5,807,437 A | 9/1998 | Sachs et al. |
| 8,043,720 B2 | 10/2011 | Corman et al. |
| 2005/0017394 A1* | 1/2005 | Hochsmann .......... B29C 64/165 264/113 |
| 2007/0138706 A1* | 6/2007 | Metzger ................ C04B 35/571 264/432 |
| 2015/0367592 A1* | 12/2015 | Martinez, III .......... C04B 35/83 428/34.1 |
| 2018/0154580 A1* | 6/2018 | Mark ...................... B29C 64/40 |

* cited by examiner

ADDITIVE LAYER METHOD FOR APPLICATION OF SLURRY-BASED FEATURES

RELATED APPLICATION

The present patent document claims the benefit of the filing date under 35 U.S.C. § 119(e) to U.S. Provisional Patent Application Ser. No. 62/632,283, which was filed on Feb. 19, 2018, and is hereby incorporated by reference in its entirety.

TECHNICAL FIELD

This disclosure relates to fabrication of ceramic matrix composites (CMCs) and, in particular, to the preform process.

BACKGROUND

Ceramic matrix composites (CMCs), which include ceramic fibers embedded in a ceramic matrix, exhibit a combination of properties that make them promising candidates for industrial applications for which excellent thermal and mechanical properties along with low weight may be advantageous, such as gas turbine engine components.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a method for making a porous ceramic preform is described. The method may include forming a stacked powder structure by depositing a binder to form a binder layer on a substrate and depositing powder on the binder to form a powder layer. The method may further include forming the porous ceramic preform by heating the stacked powder structure and pyrolyzing the binder.

One interesting feature of the systems and methods described below may be that physical features may be added to existing CMC components. Alternatively, or in addition, an interesting feature of the systems and methods described below may be that complications resulting from machining CMC components made by other methods into desired geometries may be avoided. For example, complications involving cutting into fiber bundles when machining down CMC components made by alternative methods may be avoided when utilizing the systems and methods described below. Alternatively, or in addition, an interesting feature of the systems and methods described below may be that at least due to the precise application of the binder to the substrate or the powder layer, complex and precise geometries and features are able to be formed on the substrate, which may be a ceramic fiber preform that is ultimately densified to form a CMC component.

Figure 1:
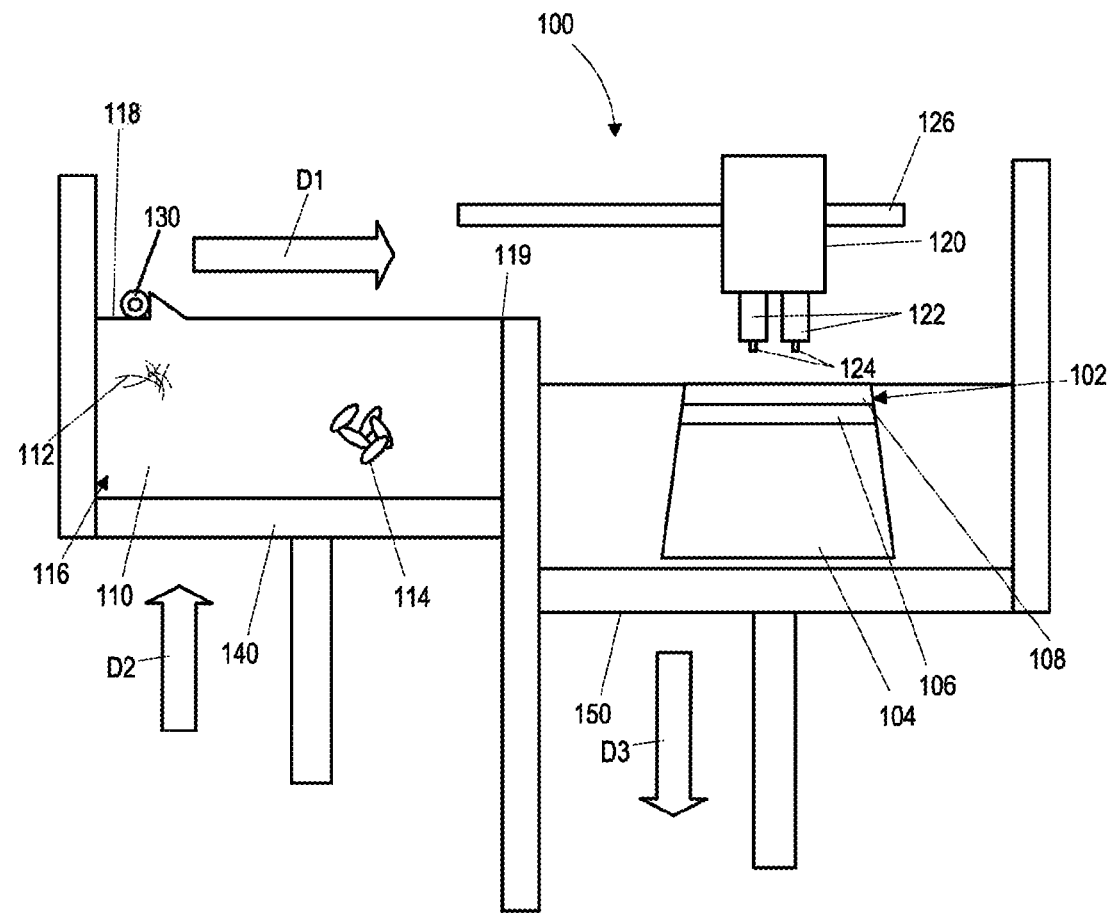
FIG. 1 illustrates an example of a system for making porous ceramic preforms.
Figure 2:
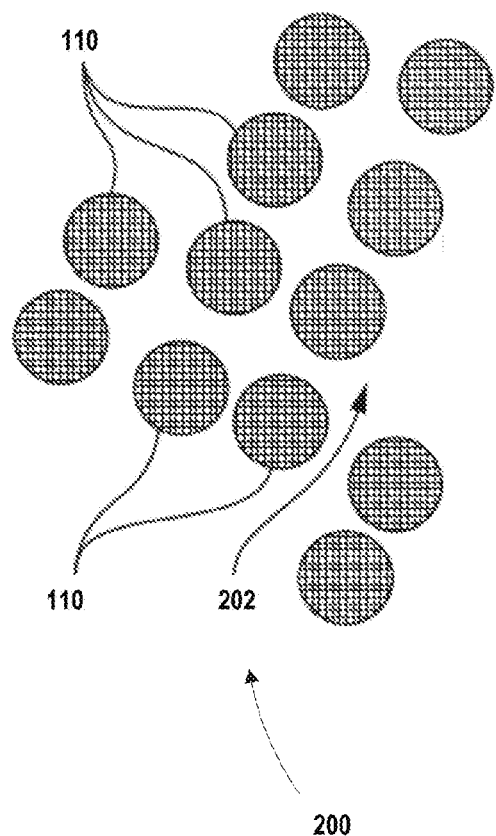
FIG. 2 illustrates an example of a cross sectional view of the porous ceramic preform.

FIG. 1 illustrates an example of a system 100 for making a porous ceramic preform 200 (a cross section of an example of the porous ceramic preform 200 is shown in FIG. 2). The system 100 may effectively "3-D print" any arbitrary shaped porous ceramic preform 200. The system 100 may include a powder 110, a dispenser 120, a roller 130, a powder stage 140, a preform stage 150, and a stacked powder structure 102. The stacked powder structure 102 may comprise a binder layer 106 and a powder layer 108 or any number of alternating layers of binder and powder. In some examples, the system 100 may include a rail 126.

The powder 110 may be any particulate matter configured to be used in a ceramic matrix composite component. Alternatively or in addition, the powder 110 may be particulate matter in the powder layer 108 as a result of being deposited on the binder layer 106. In some examples, the powder 110 may include at least one of silicon carbide, nitride, or metallic carbide. In some examples, the powder 110 may include a unimodal particle size distribution. Alternatively, the powder 110 may include a bimodal particle size distribution.

Alternatively or in addition, the powder 110 may include fibrous material 112. In some examples, the fibrous material 112 may include chopped fibers. Chopped fibers may be advantageous to avoid or limit complications that may otherwise occur later in the manufacturing process. For example, when machining a ceramic matrix composite component into a desired shape, if the machining strikes fiber tows embedded in the ceramic matrix composite component, then the fiber tows may be disturbed, thereby weakening the ceramic matrix composite component. However, if the machining strikes chopped fibers embedded in the ceramic matrix composite component, then less damage may result. Alternatively or in addition, the fibrous material 112 may include continuous fibers. Alternatively or in addition, the fibrous material 112 may include substantially spherical particles, each having a diameter, for example, in a range of between 5 and 10 microns, inclusively. Alternatively or in addition, the fibrous material 112 may include elongated particles, each having an aspect ratio, for example, between 4:1 and 20:1, inclusively. In examples where the elongated particles are rod shaped, then the aspect ratio of each rod may be a ratio of the rod's length to the rod's diameter. The aspect ratio of the reinforcement particles have been selected to provide optimal toughness, while maintaining an acceptable strength loss as a result of the flaw introduced by the particle. The fibrous material 112 may include silicon carbide or any other suitable ceramic material.

Alternatively or in addition, the powder 110 may include a reactive additive 114. The reactive additive 114 may be particulate matter configured to provide additional carbon or silicon carbide as a result of heating and/or pyrolyzing the stacked powder structure 102. Alternatively or in addition, the reactive additive 114 may be a substance configured to provide green strength to the stacked powder structure 102 as a result of heating the stacked powder structure 102. In some examples, the reactive additive 114 may include acicular particulate that reacts to form acicular silicon carbide, for example, in the stacked powder structure 102 during melt infiltration. The use of acicular silicon carbide may provide increased toughness to the stacked powder structure 102. In some examples, the reactive additive 114 may include graphite, diamond, or carbon black. Alternatively or in addition, examples of the reactive additive 114 in acicular form may include graphene or carbon fiber. The reactive additive 114 may be present to react with molten material during melt infiltration and form a reaction product. For example, the reactive additive 114 may be a ceramic precursor that can react with a molten metal or alloy (for example, silicon metal or a silicon alloy) to form a ceramic (for example, silicon carbide). Other reactive additives 114 may react with a molten metal to form an alloy in the molten state which may then react with a ceramic precursor to form a ceramic. For example, molybdenum may be used as the reactive additive 114 to form a Si—Mo alloy when exposed to molten silicon, which may then react with carbon to form a carbide including both molybdenum and silicon.

The powder 110 may be arranged in a stack 116. The stack 116 may be a stack, mound, pile, or any collection of powder 110. The stack 116 may be positioned on the powder stage 140. The powder stage 140 may be a platform or stage that moves in a direction D2 to provide powder 110 included in the stack 116 to the roller 130. The powder stage 140 may be manually operated by an operator. Alternatively or in addition, the powder stage 140 may be automated to move in the direction D2 at preselected times.

The dispenser 120 may be an apparatus or system configured to deposit a binder 124 on the stacked powder structure 102. The dispenser 120 may include a spray nozzle 122. In some examples, the dispenser 120 may contain an amount of the binder 124. The dispenser 120 may be configured to dispense the binder 124 at desired locations. In some examples, the dispenser 120 may be configured to dispense the binder 124 at predetermined locations. Alternatively or in addition, the dispenser 120 may be controlled by an operator to dispense the portion of the binder 124 at desired locations. Alternatively or in addition, the dispenser 120 may be automated to dispense the binder at predetermined locations.

The spray nozzle 122 in the dispenser 120 may be a nozzle configured to dispense the binder 124 from the dispenser 120. The spray nozzle 122 may include a channel or passage through which the binder 124 may move when the binder 124 is dispensed from the dispenser 120. In some examples with the spray nozzle 122 present, the spray nozzle 122 may provide an increase to the accuracy of the deposition of the binder 124 compared to other methods without the spray nozzle 122 present.

During operation of the system 100, the spray nozzle 122 may be positioned over a desired location and the dispenser 120 may dispense the binder 124 from the dispenser 120, through the spray nozzle 122, and apply the binder 124 to target locations on the stacked powder structure 102. In some examples, the spray nozzle 122 may be an array of nozzles for supplying the binder 124 to selected regions of the substrate 104. Alternatively or in addition, in some examples, the spray nozzle 122 may be an array of nozzles for supplying the binder 124 to selected regions of the powder layer 108.

In some examples, the dispenser 120 may be attached to the rail 126. The rail 126 may be a track or web configured to allow the dispenser 120 to move to a desired location over the stacked powder structure 102. The ability of the dispenser 120 to move may provide a means for accurately dispensing the binder 124 to a target location on the stacked powder structure 102. In some examples, the rail 126 may provide a means for the dispenser 120 to move in a 2-D plane. Alternatively or in addition, the rail 126 may provide a means for the dispenser 120 to move in 3-D space.

The binder 124 may be a substance configured to bind the powder 110 to the stacked powder structure 102. Alternatively or in addition, the binder 124 may be a substance configured to bind the powder 110 to the substrate 104. In some examples, the binder 124 may be a polymer binder. Alternatively or in addition, the binder 124 may be an organic binder. Alternatively or in addition, the binder 124 may be a substance configured to be pyrolyzed upon heating the stacked powder structure 102, such as phenolic resin, poly (furfuryl alcohol), or polycarbosilane. In some examples, pyrolyzation of the binder 124 may result in the binder 124 producing additional silicon carbide. In some examples, pyrolyzation of the binder 124 may result in gaps 202 (shown in FIG. 2) between powder 110 included in the stacked powder structure 102, resulting in the formation of the porous ceramic preform 200. Alternatively or in addition, the binder 124 may provide green strength to the stacked powder structure 102 after drying.

As noted above, the system 100 may include the roller 130. The roller 130 may be any device or system configured to deposit powder 110 onto the stacked powder structure 102 or the binder layer 106. The roller 130 may include a rolling mechanism configured to push the powder 110 onto the stacked powder structure 102. Alternatively or in addition, the roller 130 may be a moveable wall configured to push the powder 110 onto the stacked powder structure 102 or the binder layer 106. The roller 130 may be manually controlled by an operator. Alternatively or in addition, the roller 130 may be automated. In some examples, the roller 130 may be configured to travel from a first end 118 of the stack 116 of powder 110 to a second end 119 of the stack 116 of powder 110 in a direction D1. The travelling of the roller 130 from the first end 118 of the stack 116 of powder 110 toward the second end 119 of the stack 116 of powder 110 may result in powder 110 accumulating between the roller 130 and the second end 119. Upon the roller 130 arriving toward the second end 119, at least some powder 110 may be pushed onto the stacked powder structure 102 or binder layer 106. The roller 130 may then return toward the first end 118. In some examples, the powder stage 140 may be raised in the second direction D2 to provide the roller 130 with more powder 110 to push onto the stacked powder structure 102 or binder layer 106. If desired, the roller 130 may travel again from the first end 118 toward the second end 119, again accumulating powder 110, and eventually depositing the powder 110 on the stacked powder structure 102. The roller 130 may deposit as much powder 110 in this way as desired.

The stacked powder structure 102 may be a feature or structure formed by the system 100. The stacked powder structure 102 may include the substrate 104, the binder layer 106 and the powder layer 108. In some examples, the stacked powder structure 102 may include one or more binder layers 106. Alternatively or in addition, the stacked powder structure 102 may include one or more powder layers 108. In some examples, the stacked powder structure 102 may be formed by depositing the binder 124 onto the substrate 104, thereby forming the binder layer 106. Subsequently, the powder 110 may be deposited on the binder layer 106. The powder 110 deposited on the binder 106 may be bound to the binder 124 and form the powder layer 108. The binder 124 may then be deposited on the powder layer 108 forming a second binder layer (not shown), and the powder 110 may then be deposited on the second binder layer (not shown), forming a second powder layer (not shown). The stacked powder structure 102 may include any number of binder layers 106 and powder layers 108 as desired. The stacked powder structure 102 may be heated to pyrolyze the binder 124 included in the binder layer 106 and resulting in the formation of the porous ceramic preform 200. Alternatively or in addition, the stacked powder structure 102 may be heated such that the binder 124 melts to add green strength to the resulting porous ceramic preform 200.

The stacked powder structure 102 may include the substrate 104. The substrate 104 may be, for example, any surface, layer, or component configured to receive the binder 124. The substrate 104 may provide a base for the stacked powder structure 102 to which the binder 124 may be applied. In some examples, the substrate 104 may include a smooth and/or regular surface for deposition of the binder 124. Alternatively or in addition, in some examples, the substrate 104 may include an irregular surface for deposition of the binder 124. Alternatively or in addition, the substrate 104 may include a woven surface for deposition of the binder 124. In some examples, the substrate 104 may include a previously formed ceramic fiber preform. In examples where the substrate 104 includes the previously formed ceramic fiber preform, the binder 124 may be applied to the previously formed ceramic fiber preform. The stacked powder structure 102 may be constructed directly onto the previously formed ceramic fiber preform. In this way, physical features may be added to the ceramic fiber preform at target locations, thereby forming, after melt infiltration, a CMC component including densified ceramic feature(s) of any desired geometry. A non-exhaustive list of examples of physical features that may be formed in this matter may include seal lands, labyrinth seals, strip seals, load pads, locating pads, and clocking features.

The physical features added to the ceramic fiber preform may be formed by a slurry. The slurry may include a solvent and particulate solids. In some examples, the particulate solids may be the powder 110. In some examples, the solvent may be the binder 124. The powder 110 may be suspended in the binder 124 in the powder layer 108 or the binder layer 106 of the stacked powder structure 102.

The stacked powder structure 102 may include the binder layer 106. The binder layer 106 may be a layer of the stacked powder structure 102 including the binder 124. The binder layer 106 may be formed by as a result of the binder 124 being dispensed from the dispenser 120 at selected locations of the substrate 104 or the powder layer 108. The binder layer 106 may be removed by heating the stacked powder structure 102 after the stacked powder structure 102 has been formed, resulting in forming the porous ceramic preform 200. Alternatively or in addition, the binder layer 106 may act as an adhesive layer, binding the powder 110 in the powder layer 108 to the substrate 104. Alternatively or in addition, the binder layer 106 may act as an adhesive layer, binding the powder 110 in the powder layer 108 to another powder layer 108. Alternatively or in addition, the binder layer 106 may be heated to provide green strength after drying.

As explained above, the stacked powder structure 102 may include the powder layer 108. The powder layer 108 may be a layer of the stacked powder structure 102 including the powder 110. The powder layer 108 may be formed by as a result of the powder 110 being deposited from the stack 116 onto the binder layer 106. The powder layer 108 may be adhered to the substrate 104 or to another powder layer 108 by the binder 124 included in the binder layer 106. The powder layer 108 may remain after pyrolization of the binder layer 106, resulting in the formation of the porous ceramic preform 200.

The stacked powder structure 102 may be positioned on the preform stage 150. The preform stage 150 may be a platform or stage that moves in a direction D3 to provide space for the powder 110 received from the stack 116 via the roller 130. Alternatively or in addition, the preform stage 150 may move in the direction D3 to provide space for the dispenser 120 to dispense the binder 124 onto the substrate 104 or, alternatively, for the dispenser 120 to dispense the binder 124 onto any previously formed powder layer 108. The preform stage 150 may be manually operated by an operator. Alternatively or in addition, the preform stage 150 may be automated to move in the direction D3 at preselected times.

The binder layer 106 and the powder layer 108 may be distinct layers or commingled. The powder 110 may naturally sink into the binder layer 106 when the powder 110 is deposited on the binder layer 106. In this way, the particulate powder 110 may commingle with the binder 124 in the stacked powder structure 102, in some examples.

FIG. 2 shows an example of a cross sectional view of the porous ceramic preform 200. The porous ceramic preform 200 may be a preform configured to be infiltrated with a molten material comprising silicon in order to densify the powder and form a ceramic matrix composite component with the features added during operation of the system 100. After pyrolysis of the binder 124, the porous ceramic preform 200 may be formed. A gap 202 between powder 110 particles may assist with a melt infiltration of the porous ceramic preform 200. The gap 202 may be the space between adjacent powder 110 particulate included in the porous ceramic preform 200. The gap 202 may provide increased porosity of the porous ceramic preform 200 compared to ceramic preforms without the gap 202. The porous ceramic preform 200 may be infiltrated with the molten matrix material comprising silicon in order to densify the composite in a process known as melt infiltration. During melt infiltration, molten material flows through the porous ceramic preform 200 and reacts with any reactive additive 114 in the flow path. Upon cooling of the melt, the infiltrated porous ceramic preform becomes a densified ceramic feature or coating that includes one or more ceramics, such as one or more carbides, nitrides, silicides, and/or borides. The densified ceramic feature may include: (a) ceramic reaction products resulting from the reaction between the molten material and any reactive additive 114 in the porous ceramic preform 200 and/or (b) any powder 110 (for example, SiC particles) present prior to melt infiltration. The densified ceramic feature may also include a residual amount of unreacted metal, typically silicon or a silicon alloy, and there may also be a residual amount of carbon. In some embodiments, such as when the powder 110 includes fibers 112, the densified ceramic feature may be a densified composite feature. The densified ceramic feature may have any desired geometry ranging from a continuous coating on the substrate to one or more discrete features each having a size and shape determined by the originally-formed stacked powder structure.

Figure 3:
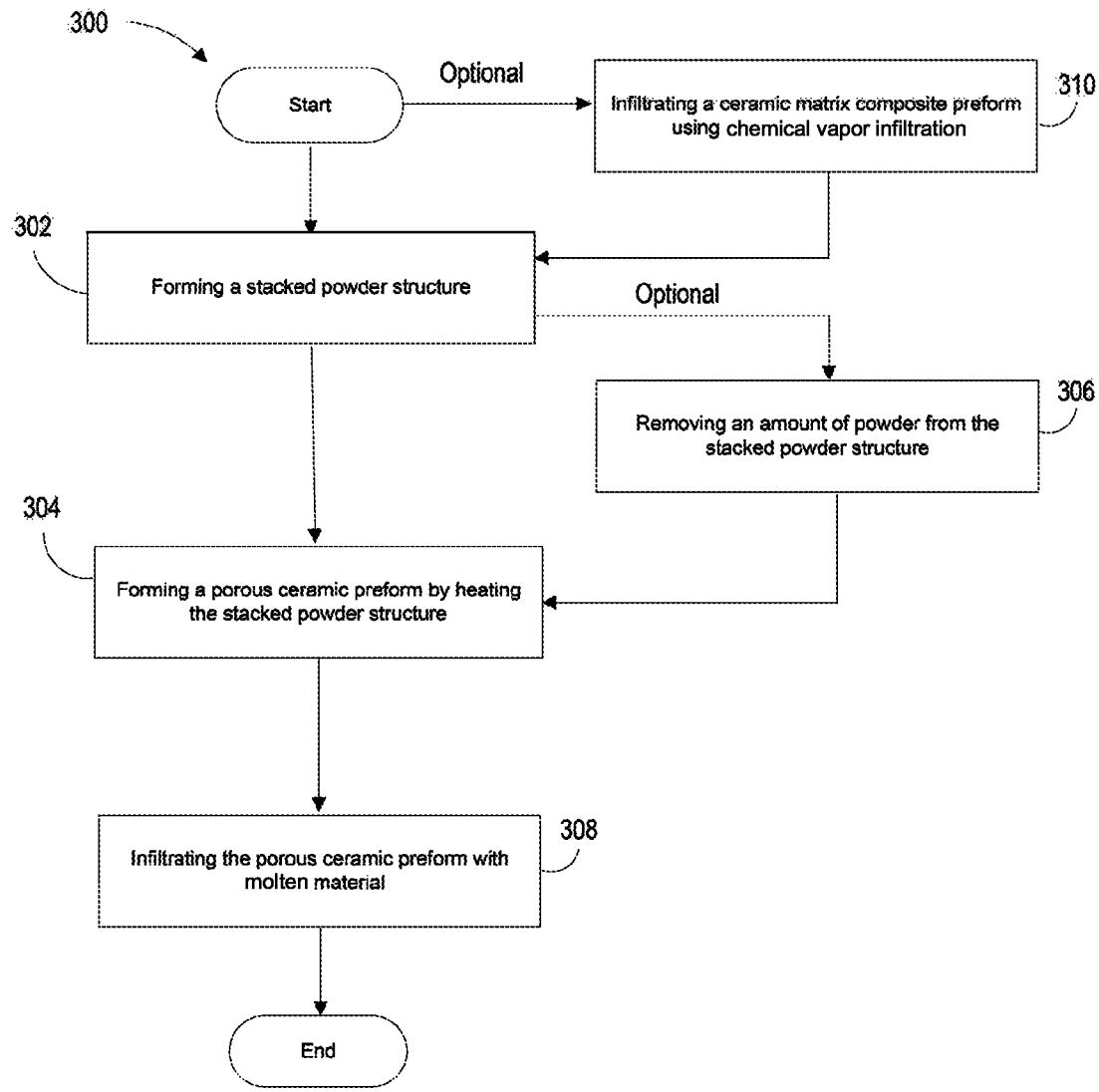
FIG. 3 illustrates a flow diagram of an example of a method for making a porous ceramic preform.

FIG. 3 illustrates a flow diagram 300 of an example of a method to manufacture the porous ceramic preform 200. The steps of the method may include additional, different, or fewer operations than illustrated in FIG. 3. The steps may be executed in a different order than illustrated in FIG. 3.

The method may include forming 302 the stacked powder structure 102, for example by the system 100. The stacked powder structure 102 may be formed by, for example, depositing the binder 124 with the spray nozzle 122 onto a substrate 104 to form the binder layer 106 and depositing the powder 110 onto the binder layer 106 to form the powder layer 108. As indicated above, in some examples the substrate 104 may comprise a ceramic fiber preform that is ultimately densified to form a CMC component. In some examples, the method may include controlling the spray nozzle 122 to supply the binder 124 to predetermined portions of the substrate 104 or the powder layer 108. In some examples, the powder 110 may be moved by the roller 130 and deposited onto the binder layer 106 to form the powder layer 108. Any number of binder layers 106 may be formed in the stacked powder structure 102 by depositing the binder 124 onto either the substrate 104 or a powder layer such as the power layer 108 shown in FIG. 1. Similarly, any number of powder layers 108 may be formed by depositing the powder 110 on a binder layer such as the binder layer 106 shown in FIG. 1.

Forming 302 the stacked powder structure 102 may further include positioning the substrate 104 on the preform stage 150 and lowering the preform stage 150 in the D3 direction (as shown in FIG. 1). Lowering the preform stage 150 may provide additional space while forming 302 the stacked powder structure 102 to allow for powder 110 or binder 124 to be deposited.

The method may further include forming 304 the porous ceramic preform 200 by heating the stacked powder structure 102. Forming 304 the porous ceramic preform 200 may include pyrolyzing the binder 124 included in the binder layer 106. The resulting porous ceramic preform 200 may be infiltrated by a matrix material. In some examples, the binder 124 may pyrolyze and produce additional silicon carbide, thus adding to the green strength of the porous ceramic preform 200.

Alternatively or in addition, the method may include removing 306 an amount of the powder 110 from the stacked powder structure 102. The powder 110 removed from the stacked powder structure 102 may be undesired powder 110 pushed onto or around the binder layer 106 by the roller 130. The removal 306 of some of the powder 110 from the stacked powder structure 102 may be accomplished by any means necessary, preferably without damaging the integrity of the stacked powder structure 102. Examples of suitable removal 306 techniques may include washing, scrubbing, or air jet cleaning.

Alternatively or in addition, the substrate 104 used in the method may include an already-formed ceramic fiber preform. In some examples, the ceramic fibers that make up the ceramic fiber preform may comprise silicon carbide, and the ceramic matrix formed upon densification may also comprise silicon carbide. In some examples, the ceramic fibers and/or the ceramic matrix may also or alternatively comprise silicon nitride, alumina, aluminosilicate, boron carbide and/or another refractory carbide. The already-formed ceramic fiber preform may be treated with chemical vapor infiltration (CVI) to provide a layer of environmental protection. In some examples, the CVI may occur prior to the construction of the stacked powder structure 102. Alternatively, the CVI may occur subsequent to the addition of the stacked powder structure 102 on the already-formed ceramic fiber preform. In some examples, CVI may include applying a chemical vapor infiltration coating to the already-formed ceramic fiber preform prior to melt infiltration and/or the construction of the stacked powder structure 102 to stiffen the ceramic fibers in the already-formed ceramic fiber preform. Alternatively or in addition, CVI may include applying the chemical vapor infiltration coating to the already-formed ceramic fiber preform instead of melt infiltrating the already-formed ceramic fiber preform. The chemical vapor infiltrated coatings provide numerous benefits to the overall ceramic system such as rigidity, controlled crack propagation, environmental protection, increased porosity in the final ceramic matrix composite, and coating adherence.

The method may include infiltrating the porous ceramic preform 200 with a molten material. The molten material may comprise silicon as described above, forming, upon cooling, a matrix material comprising silicon carbide or other ceramic material. Prior to melt infiltration, the porous ceramic preform 200 may be infiltrated with a slurry comprising the matrix material in particulate form in a slurry infiltration process. In some examples, the matrix material may include silicon carbide, but the matrix material may also or alternatively include silicon nitride, alumina, aluminosilicate, boron carbide and/or another refractory carbide. As used throughout the specification, the term "silicon carbide" refers broadly to the compound SiC as well as to other silicon-containing carbides.

Melt infiltration may be a process in which the molten material infiltrates the porous ceramic preform 200 and reacts with any reactive additives 114 present in the porous ceramic preform 200. When the substrate 104 comprises an already-formed ceramic fiber preform, the ceramic fiber preform may also undergo infiltration. After infiltration, the molten material is cooled, and a densified ceramic feature is formed in some examples on a densified ceramic matrix composite component comprising ceramic fibers embedded in a ceramic matrix. The ceramic feature(s), which may include composite feature(s), as mentioned above, is formed from the particulate matter in the porous ceramic preform 200 as well as any ceramic reaction products created from the reaction between the molten material and the reactive additives 114 in the porous ceramic preform 200. After melt infiltration, the ceramic preform 200 may be described as an infiltrated porous layer or feature, or as a densified ceramic coating or feature, that includes one or more ceramics, such as one or more carbides, nitrides, silicides and/or borides, and, in some cases, a residual amount of unreacted metal or alloy (again, typically silicon or a silicon alloy). The densified ceramic coating or feature may remain on the substrate (which after infiltration may be a CMC component) or may be removed in whole or in part (for example, by machining).

In some examples, as mentioned above, the powder 110 may include fibers 112. In some examples, infiltrating the porous ceramic preform 200 with the molten material to form the densified ceramic feature may result in a fiber-to-matrix material ratio of between 20% and 45% by volume. The densified ceramic feature having a fiber-to-matrix material ratio in the described range may provide components with improved strength and structural integrity compared to components having a fiber-to-matrix material ratio outside of the stated range. However, though the recited fiber-to-matrix material ratio is advantageous, it is not necessary and should not be interpreted to limit the scope of any claims expect those explicitly reciting the fiber-to-matrix ratio.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, and not the only possible embodiments and implementations.

The subject-matter of the disclosure may also relate, among others, to the following aspects:

A first aspect relates to a method of forming a stacked powder structure comprising a binder layer and a powder layer on the binder layer, wherein forming the stacked powder structure comprises forming the binder layer by depositing a binder with a spray nozzle on a substrate and forming the powder layer on the binder layer by depositing a powder on the binder layer; and forming a porous ceramic preform by heating the stacked powder structure to pyrolyze the binder, the porous ceramic preform configured to be infiltrated by a molten material. The substrate may comprise a ceramic fiber preform. After melt infiltration of the porous ceramic preform and the ceramic fiber preform, a densified ceramic feature having a predetermined geometry may be formed on a ceramic matrix composite (CMC) component.

A second aspect relates to the method of aspect 1, further comprising: removing an amount of the powder from the stacked powder structure prior to forming the porous ceramic preform.

A third aspect relates to the method of aspects 1 or 2, wherein the powder comprises fibers, and the method further comprises: infiltrating the porous ceramic preform with the molten material resulting in a densified composite feature having a fiber-to-ceramic matrix material ratio of between 20% and 45%.

A fourth aspect relates to the method of any preceding aspect, wherein the powder comprises at least one of silicon carbide, nitride, or a metallic carbide.

A fifth aspect relates to the method of any preceding aspect, wherein the spray nozzle comprises an array of nozzles for supplying the binder to selected regions of the substrate.

A sixth aspect relates to the method of any preceding aspect, further comprising controlling the spray nozzle to supply the binder to predetermined portions of the substrate.

A seventh aspect relates to the method of any preceding aspect wherein the powder comprises a plurality of chopped fibers, each having a diameter in a range of between 5 microns and 10 microns, inclusively, and the chopped fibers have an aspect ratio between 4 and 20, inclusively.

An eighth aspect relates to the method of any preceding aspect, wherein the binder layer is a first binder layer and the powder layer is a first powder layer, and forming the stacked powder structure further comprises forming a second binder layer by depositing the binder on the first powder layer and forming a second powder layer by depositing the powder on the second binder layer.

A ninth aspect relates to the method of any preceding aspect, further comprising: placing the substrate on a stage; and lowering the stage before depositing the powder on the binder.

A tenth aspect relates to the method of any preceding aspect, wherein the powder comprises powdered silicon carbide and a reactive additive.

An eleventh aspect relates to the method of the tenth aspect, wherein the reactive additive comprises at least one of graphite, diamond, or carbon black.

A twelfth aspect relates to the method of any preceding aspect, wherein the reactive additive comprises acicular particulate.

A thirteenth aspect relates to the method of the twelfth aspect, wherein the acicular particulate comprises at least one of carbon fiber or graphene.

A fourteenth aspect relates to the method of any preceding aspect, wherein heating the stacked powder structure causes the binder to produce silicon carbide.

A fifteenth aspect relates to the method of any preceding aspect, wherein the binder comprises at least one of phenolic resin, poly(furfuryl alcohol), or polycarbosilane.

A sixteenth aspect relates to the method of any preceding aspect, wherein the powder comprises a unimodal particle size distribution.

A seventeenth aspect relates to the method of any preceding aspect, wherein the powder comprises a bimodal particle size distribution.

An eighteenth aspect relates to the method of any preceding aspect, wherein the substrate comprises a ceramic fiber preform, the ceramic fiber preform having been infiltrated by a slurry, the slurry comprising silicon carbide.

A nineteenth aspect relates to the method of any preceding aspect, comprising: forming a stacked powder structure comprising a first binder layer, a first powder layer on the first binder layer, a second binder layer on the first powder layer, and a second powder layer on the second binder layer, wherein forming the stacked powder structure comprises forming the first binder layer by depositing a binder with a spray nozzle on a substrate, forming the first powder layer on the first binder layer by depositing a powder on the first binder layer, forming the second binder layer on the first powder layer by depositing the binder with the spray nozzle on the first powder layer, and forming the second powder layer by depositing the powder on the second binder layer, the powder comprising fibers, including silicon carbide fibers wherein the fibers comprise chopped fibers having a diameter in a range of between 5 microns and 10 microns, inclusively, and the chopped fibers have an aspect ratio between 4 and 20, inclusively; forming a porous ceramic preform by heating the stacked powder structure to pyrolyze the binder, the porous ceramic preform configured to be infiltrated by a molten material; and infiltrating the porous ceramic preform with the molten material resulting in a densified composite feature on the substrate, the densified composite feature having a fiber-to-ceramic matrix material ratio of between 20% and 45%.

A twentieth aspect relates to the method of the nineteenth aspect, wherein the substrate is a ceramic fiber preform, and the method further comprises: infiltrating the ceramic fiber preform using chemical vapor infiltration.

What is claimed is:

1. A method comprising:
    forming a stacked powder structure on a substrate comprising a previously formed ceramic fiber preform, the stacked powder structure comprising a binder layer and a powder layer on the binder layer, wherein forming the stacked powder structure comprises forming the binder layer by depositing a binder with a spray nozzle on the substrate and forming the powder layer on the binder layer by depositing a powder on the binder layer, the binder comprising at least one of phenolic resin, poly (furfuryl alcohol), and polycarbosilane, and the powder comprising silicon carbide; and
    heating the stacked powder structure to pyrolyze the binder, and infiltrating the stacked powder structure and the previously formed ceramic fiber preform with molten silicon metal or silicon alloy, thereby forming a CMC component including a densified composite feature on the CMC component.

2. The method of claim 1, further comprising:
removing an amount of the powder from the stacked powder structure prior to the heating.

3. The method of claim 1, wherein the powder comprises fibers, and the method further comprises:
wherein the densified composite feature has a fiber-to-ceramic matrix material ratio of between 20% and 45%.

4. The method of claim 1, wherein the spray nozzle comprises an array of nozzles for supplying the binder to selected regions of the substrate.

5. The method of claim 1, further comprising controlling the spray nozzle to supply the binder to predetermined portions of the substrate.

6. The method of claim 1, wherein the powder comprises a plurality of chopped fibers, each having a diameter in a range of between 5 microns and 10 microns, inclusively, and the chopped fibers have an aspect ratio between 4 and 20, inclusively.

7. The method of claim 1, wherein the binder layer is a first binder layer and the powder layer is a first powder layer, and forming the stacked powder structure further comprises forming a second binder layer by depositing the binder on the first powder layer and forming a second powder layer by depositing the powder on the second binder layer.

8. The method of claim 1, further comprising:
placing the substrate on a stage; and
lowering the stage before depositing the powder on the binder.

9. The method of claim 1, wherein the powder further comprises a reactive additive.

10. The method of claim 9, wherein the reactive additive comprises at least one of graphite, diamond, and carbon black.

11. The method of claim 9, wherein the reactive additive comprises acicular particulate.

12. The method of claim 11, wherein the acicular particulate comprises at least one of carbon fiber and graphene.

13. The method of claim 1, wherein heating the stacked powder structure causes the binder to produce silicon carbide.

14. The method of claim 1, wherein the powder comprises a unimodal particle size distribution.

15. The method of claim 1, wherein the powder comprises a bimodal particle size distribution.

16. The method of claim 1, wherein the previously formed ceramic fiber preform has been infiltrated by a slurry, the slurry comprising silicon carbide.

17. A method comprising:
forming a stacked powder structure on a substrate comprising a previously formed ceramic fiber preform, the stacked powder structure comprising a first binder layer, a first powder layer on the first binder layer, a second binder layer on the first powder layer, and a second powder layer on the second binder layer, wherein forming the stacked powder structure comprises forming the first binder layer by depositing a binder with a spray nozzle on the substrate, the binder comprising at least one of phenolic resin, poly(furfuryl alcohol), and polycarbosilane, forming the first powder layer on the first binder layer by depositing a powder on the first binder layer, forming the second binder layer on the first powder layer by depositing the binder with the spray nozzle on the first powder layer, and forming the second powder layer by depositing the powder on the second binder layer, the powder comprising fibers, including silicon carbide fibers wherein the fibers comprise chopped fibers having a diameter in a range of between 5 microns and 10 microns, inclusively, and the chopped fibers have an aspect ratio between 4 and 20, inclusively;
heating the stacked powder structure to pyrolyze the binder, and infiltrating the stacked powder structure and the previously formed ceramic fiber preform with molten silicon metal or silicon alloy, thereby forming a CMC component including a densified composite feature on the CMC component; and
wherein the densified composite feature has a fiber-to-matrix material ratio of between 20% and 45%.

18. The method of claim 17, wherein the densified composite feature includes a seal land, labyrinth seal, strip seal, load pad, locating pad, and/or clocking feature.

* * * * *